June 1, 1943.    J. H. SHEPARD ET AL    2,320,389
TRACTOR DRIVEN SNOW PLOW ASSEMBLY
Filed Nov. 1, 1940
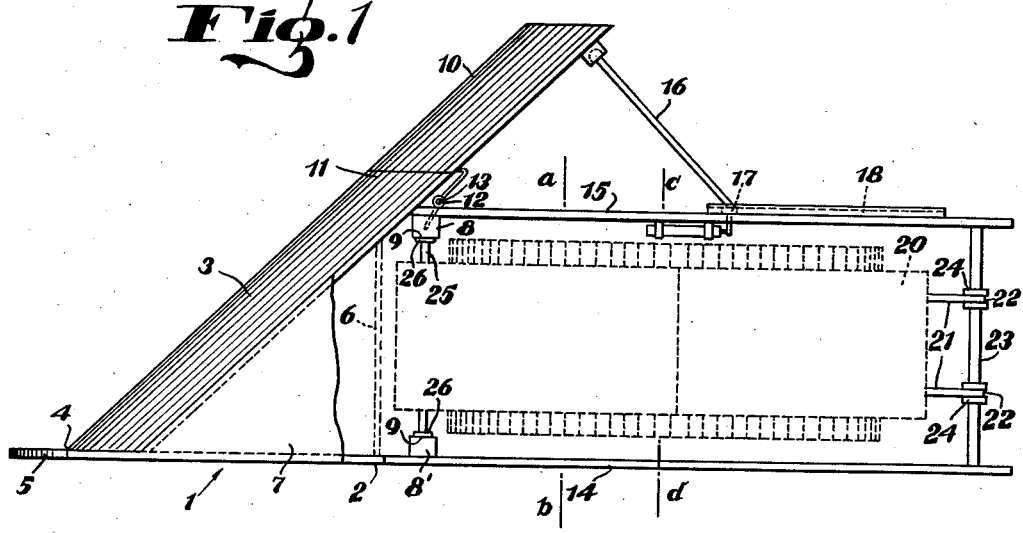
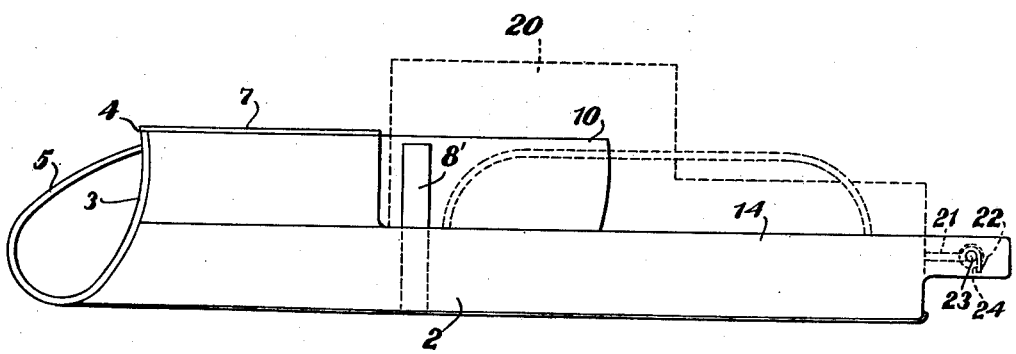
Inventors
John H. Shepard
Napoleon Picard
By John E. R. Hayes
Attorney Patented June 1, 1943

2,320,389

UNITED STATES PATENT OFFICE 2,320,389

TRACTOR DRIVEN SNOWPLOW ASSEMBLY

John H. Shepard and Napoleon Picard, Rochester, N. H.

Application November 1, 1940, Serial No. 363,848

2 Claims. (Cl. 37—42)

The invention relates to a tractor driven snow plow assembly in which the plow has a diagonal blade, and which assembly is designed especially for clearing sidewalks or the like.

A plow with a diagonal blade is especially desirable for sidewalk use in order that the plow may be run adjacent a building, or along an inside curb, and the snow be expelled in one direction away from the building, or inside curb, over the outer edge, or edge portion, of the sidewalk and into the gutter or street.

Inasmuch as trees or other obstructions are likely to be encountered the diagonal blade is preferably made to include a foldable portion or wing which may be folded in, in order that the plow may pass through a relatively narrow space, much narrower than the normal width of the plow, thus avoiding the tree or other obstruction.

In practice it is necessary that the plow, when used under the conditions and for the specified purpose, should maintain in so far as possible a straight line of movement, except as purposely varied, or as the plow is turned.

With such a plow the resistance offered by the snow to its displacement tends to laterally turn the plow, and on this account great difficulty has been encountered in its adaptation to a tractor drive, the displacing force exerted by the snow during its removal tending to displace or turn the tractor, and it is hard to keep straight the course of the plow. The difficulty is aggravated in that a relatively light, narrow tractor, or one more easily displaced, need be employed inasmuch as the plow must at times pass through a relatively narrow space. Difficulty is further aggravated by the fact that when the tractor is employed for sidewalk use its traction members or shoes, need be made of rubber which especially lend themselves to slippage.

The essential object of the invention is to provide an assemblage in which a snow plow with diagonal blade may be driven by a tractor with substantially no tendency for lateral displacement or turning of the tractor during the operation of the plow.

The object of the invention is attained by an assemblage which brings about a resultant of forces tending to resist that displacing force exerted by the snow during the operation of the plow which otherwise would tend to turn the plow and with it the tractor.

The invention can best be seen and understood in the light of the drawing, in which Fig. 1 is a plan of the assembled plow and tractor, and Fig. 2 is a side elevation thereof.

In the drawing 1 represents the fore end portion or head of the plow having a side 2 from which extends obliquely a diagonal blade 3. This blade is rigidly connected to the head 1. The blade and side combine to form the nose or apex 4 at the front of the plow which is preferably provided with a ring 5. The head of the plow and blade are reinforced and stiffened with any suitable interior braces or frame pieces 6. The head is provided with a deck 7.

Built into the head of the plow at points well back of its apex and adjacent its side and blade, respectively, interiorly thereof, are vertical posts 8 and 8' oppositely spaced from one another. The posts, of appreciable size, are preferably rectangular in cross section, each presenting on its interior side a long wide face 9.

Loosely connected to the head of the plow is a foldable wing 10. As will be observed, the blade 3 extends rearwardly by an edge portion 11 for a short distance beyond the post 8, and the wing, fitting in back of the edge portion of the blade thus projecting, is hingedly secured to the post 8 by suitable rings 12 on the wing and post, respectively, through which is passed a rod 13. When the wing is moved out into an operative position, turning on its hinge connection with the post, it co-operates with the blade 3 to lie in extension thereof, lengthening the blade and thereby widening the plow. When moved into an out of the way position the wing lies in back of the edge portion 11 of the blade 3 which then represents the full width of the plow.

Rigidly connected to the head 1 of the plow are relatively long spaced runners 14 and 15, respectively. These runners extend alongside the tractor from front to rear thereof. They support the plow. Each of the runners is made of appreciable thickness and is set on edge, rising vertically from the sidewalk on which it rests during the working of the plow, for some appreciable height. This is especially so of the runner 14, which, as will later be explained, has certain functional adaptability for assisting in resisting forces which might otherwise tend to displace the plow and tractor. Both runners are rigid with the head of the plow. The runner 14 lies flush with its side 2, in fact the runner 14 is preferably made to extend by the post 8' and form the lower portion of the side 2 with extension to the nose or apex 4, and the runner 15 lying parallel with the runner 14 is fixed in any suitable manner to the head 1 of the plow, as by securing it to the post 8.

The foldable wing 10 is controlled by a brace 16 which connects at one end with the wing, preferably at a point adjacent its outer edge, and thence extends to connect with a shoe 17 slidable within a way 18 on the side of or within the beam 15. The position of the shoe is obtained and maintained within the slide at any determinate position, in any suitable manner but preferably by some hydraulic device, or mechanism, not shown. Sliding of the shoe 17 within its way 18 is between the limits which define the open and closed position of the wing.

20 represents the tractor by which the plow is moved. The tractor is indicated diagrammatically to show the manner it combines with the plow, and its relative relationship thereto. The tractor is arranged between the beams 14 and 15 which flank the tractor on either side thereof. The tractor extends at its fore end between the vertical posts 8 and 8' on the head of the plow, and thence some little distance into the head.

The plow is driven by application of force from the rear end of the tractor. Secured to the frame of the tractor at the back on the under side thereof are spaced brackets 21 presenting ends 22 through which laterally extends a bar 23. The bar turns within the ends of the brackets, but is fixed against lateral displacement with relation thereto by means of suitable collars 24 on the bar which laterally engage the ends of the brackets. The ends of the bar 23 are fixed, respectively, to the ends of the beams 14 and 15, the beams then functioning as driving members through which the driving force of the tractor is imparted to the body of the plow for moving it through the snow.

The frame of the tractor, adjacent its front end underneath the tractor, has secured to it a cross bar 25. Borne by the ends of this bar are shoes 26 which bear, respectively, against, and are slidable upon, the faces 9 of the respective posts 8 and 8'. The fixed location of the cross bar 25 is as far back from the fore end of the tractor as possible without interfering with its driving gear. Thus arranged the plow, pivoted at its rear end by the bar 23 to the tractor, has a certain flexibility of movement at the front where the body of the plow may be raised or lowered as occasion may require, the shoes 26 then sliding upon the vertical faces 9 of the posts 8 and 8'.

Inasmuch as the plow is not borne by the tractor they constitute separate units, each having its own center of gravity. a—b represents a line within which lies the center of gravity of the plow; c—d the line within which lies the center of gravity of the tractor. The beams 14, 15 of the plow extend by the tractor on either side thereof with extension fore and aft of the center of gravity of the tractor. The plow is in bearing engagement with the ends of the tractor at the front and back. The blade 3 and wing 10 are such, and so arranged, that when the wing is in its turned out operative position the resultant force exerted against the blade by the snow, as the plow is moved through the snow, will pass substantially laterally through the center of gravity of the plow and will be transmitted through the plow, in engagement with the ends of the tractor, as aforesaid, to pass laterally substantially through the center of gravity of the tractor without exerting thereon a turning movement.

If there is any tendency to displacement it is sidewise, or translatably, and to this both the plow and tractor will offer the highest degree of resistance. Moreover, any tendency of the snow to move the plow and tractor translatably as a whole is further modified by the fact that the runner 14 and side 2 of the plow body will collectively present a bearing surface against the snow through which the plow is passing. This surface extends substantially equal distance fore and aft the center of balance of the plow and will be thrust as a whole against the snow through which the plow is moving to resist any translatory movement of the unit; thus the snow itself, especially if it be of considerable depth, or heaviness, will materially resist any tendency of the parts to lateral displacement, and consequently any lateral displacement of the tractor from its straight course, or line of travel.

The brace 16 for the wing is preferably brought to bear against the side of the plow body, or runner 15, at a point back of the center of gravity of the plow in order to obtain a better distribution of internal forces on the plow body, and avoid, in so far as possible, tortional strains, as the plow body is preferably made of wood.

When the wing is turned into its out of the way position to enable the plow to go through a narrow space, as by a tree which may be located on the sidewalk, then there is a tendency on the part of the plow to turn the tractor, but inasmuch as this is more or less momentary it can be compensated for and rectified by the driver through manipulation of the tractor.

We claim:

1. In a tractor driven snow plow assembly the combination comprising a tractor and a plow, each having its own center of gravity, said plow having a body including a head and a pair of runners fixedly connected to the head and extending alongside the tractor from front to rear thereof, said runners being adapted to support the plow and to resist lateral movement thereof, means connecting the rear ends of the runners for maintaining their spaced relationship both to each other and to the sides of the tractor and for connecting the runners to the tractor at the back of the tractor, means providing lateral bearings between the plow body and the tractor on either side thereof at the front of the tractor, a diagonal blade borne by the head of the plow, a wing hingedly secured to the plow adjacent the end of the blade, means for supporting said wing from the body of the plow whereby it may occupy an out-turned position substantially in extension of said blade, said blade and wing being such, and so arranged, that when said wing is in its out-turned operative position the resultant force exerted against the blade and wing by the snow as the plow is moved through the snow, will be transmitted through the plow in engagement with the tractor as aforesaid to pass laterally substantially through the center of gravity of the tractor without exerting thereon a turning movement.

2. In a tractor driven snow plow assembly the combination comprising a tractor and a plow, each having its own center of gravity, said plow having a body including a head and a pair of runners fixedly connected to the head and extending alongside the tractor from front to rear thereof, said runners being adapted to support the plow and to resist lateral movement thereof, means connecting the rear ends of the runners for maintaining their spaced relationship both to each other and to the sides of the tractor and for connecting the runners to the tractor at the back of the tractor, means providing lateral bearings between the plow body and the tractor on either side thereof at the front of the tractor, a diagonal blade borne by the head of the plow, a wing hingedly secured to the plow adjacent the end of the blade, a brace bar for supporting said wing in its out-turned operative position from off the adjacent one of said runners at a point back of its center of gravity, said blade and wing being such, and so arranged, that when said wing is in its out-turned operative position the resultant force exerted against the blade and wing by the snow as the plow is moved through the snow, will be transmitted through the plow in engagement with the tractor as aforesaid to pass laterally substantially through the center of gravity of the tractor without exerting thereon a turning movement.

JOHN H. SHEPARD.
NAPOLEON PICARD.